United States Patent [19]

Shogren

[11] 4,373,803
[45] Feb. 15, 1983

[54] PRECESSION SCANNING SYSTEM FOR COPIER DEVICE

[75] Inventor: David K. Shogren, Ontario, N.Y.

[73] Assignee: Xerox Corporation, Stamford, Conn.

[21] Appl. No.: 190,110

[22] Filed: Sep. 24, 1980

[51] Int. Cl.³ .......................................... G03G 15/30
[52] U.S. Cl. ......................................... 355/49; 355/8; 355/11; 355/66
[58] Field of Search ................... 355/47, 49, 8, 11, 66

[56] References Cited

U.S. PATENT DOCUMENTS

| 3,454,335 | 7/1969 | Caldwell et al. | 355/8 |
| 3,650,621 | 3/1972 | Lewis et al. | 355/8 |
| 3,754,822 | 8/1973 | Melrose | 355/8 |

Primary Examiner—Monroe H. Hayes

[57] ABSTRACT

An optical scanning system is provided which imagewise exposes a photoreceptor surface at a rate faster than the rate at which the image is scanned. In a preferred embodiment, a dual-rate mirror assembly is driven at a value greater than the process speed of a photoreceptor drum. A movable drum reflector reflects the image in precession fashion along the drum surface in a direction opposite the drum rotation.

6 Claims, 1 Drawing Figure

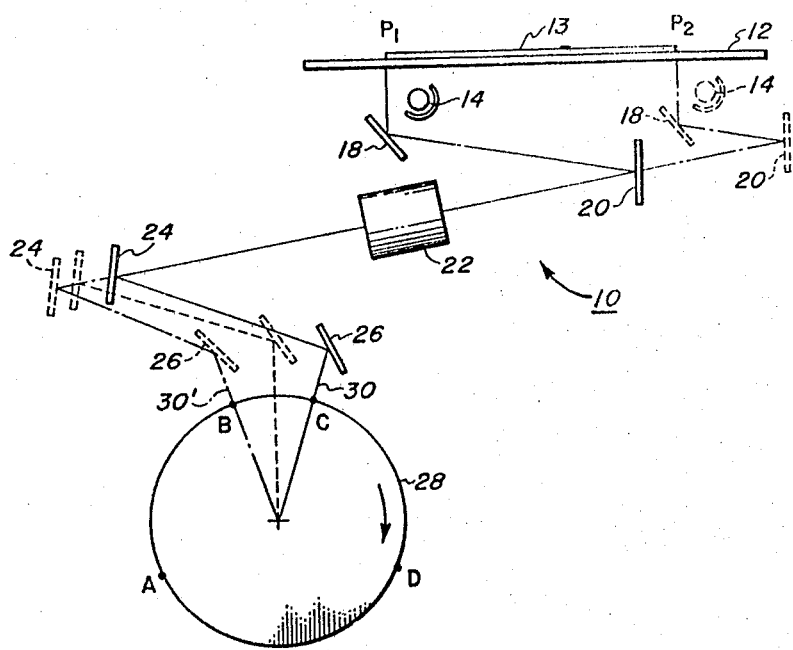

PRECESSION SCANNING SYSTEM FOR COPIER DEVICE

BACKGROUND AND PRIOR ART

This invention relates generally to a xerographic copying device and, more particularly to an optical system which scans a document lying in a flat object plane and projects the scanned image onto a curved moving photoreceptor at a rate faster than the rate of movement of the photoreceptor and in the direction opposite such photoreceptor movement.

Precession scan systems which expose images on a photoreceptor at a faster rate than the photoreceptor movement are known in the art. U.S. Pat. No. 3,454,335 (Caldwell) assigned to the same assignee as the present invention, discloses a method of projecting images on microfilm cards which are moved past a stationary lens and mirror system onto a drum photoreceptor. The drum and microfilm are moved at the same speed but the image is precessed (moved in a direction opposite to the drum motion) onto the drum surface by means of a slit aperture which moves in a direction opposite that of the drum. This combined slit and drum motion exposes the drum at a speed (rate) that is greater than the surface speed of the drum.

Another prior art device which utilizes precession onto a drum photoreceptor is disclosed in U.S. Pat. No. 3,650,621 (Lewis) also assigned to the same assignee as the present invention. Lewis discloses a system wherein an imaging device is moved in an arcuate path which is in a direction opposite to drum rotation to scan a document on a curved platen onto the drum. Precession onto a flat photoreceptor surface is disclosed in U.S. Pat. No. 3,754,822 (Melrose) also assigned to the same assignee as the present invention.

The above disclosed scanning systems demonstrate two of the advantages gained by image precession: the process speed of the system can be set at a lower speed, for equivalent copy rate (copies per minute) and the gap ordinarily present between images (due to the return time of the scan optics) can be reduced or eliminated if desired. Scan return velocities for a given copy rate can also be minimized thus reducing scan accelerations, forces and vibrations.

A problem with utilizing a precession scan system with a curved or drum-type photoreceptor, however, is that defocusing errors may result in developed images unacceptable for some systems. The errors are introduced because the image reflected from the drum mirror to the slit does not maintain perpendicularity to a tangential line at the drum surface. This defocusing problem is addressed in U.S. Pat. No. 4,232,960 (Glab) assigned to the same assignee as the present invention. Glab solves the problem of field tilt, in his particular scan system, by using linear and rotational motions of optical elements located near the drum surface to scan the image onto the drum at the angle corresponding to the angle of reflection of the image from the platen.

SUMMARY

It is therefore an object of the present invention to provide a scanning system for a copying device which precesses an image onto a curved photoreceptor surface. It is a further object to provide a precession scanning system to be used in a full-rate, half-rate scan system. These objects are accomplished by a scanning system for scanning a document placed on a flat platen and creating a latent image of said document on a drum photoreceptor surface, said system comprising illumination scanning means for scanning said document including means to move said scanning means from a start-of-scan to an end-of-scan position at a first velocity $V_s$, projection means positioned along the system optical path and arranged to transmit reflected images from said document during said scanning towards said photoreceptor, means for rotating said photoreceptor at a second velocity $V_D$ less than $V_s$, and reflector means positioned between said projection means and said photoreceptor, said means adapted to precess the projected images onto and along said photoreceptor surface in a direction opposite to the motion of said surface and at a precess velocity $V_p$ equal to $V_s-V_D$, said reflector means further adapted to maintain its incident axis substantially perpendicular to the photoreceptor surface during said scanning.

DRAWINGS

For a better understanding of the present invention, reference may be had to the accompanying drawing which show a precession scan system utilizing a dual rate illuminator scan system according to the invention.

DESCRIPTION

Referring now to FIG. 1, there is shown a scanning system 10 comprising a flat platen 12 having on its surface a document 13 whose length is successively scanned by lamp/reflector assembly 14. Placed along optical path 16 are a full-rate scan mirror 18, half-rate mirror 20, lens 22, folding mirror 24 and drum mirror 26.

According to one aspect of the present invention, the document image is projected onto the surface of drum photoreceptor 28 in a precession mode by driving the dual-rate mirror assembly at a scan rate which is set at some value greater than the rotational speed (process speed) of drum 28. As the drum rotates in the clockwise direction indicated, the scanned and projected image is reflected onto the drum surface by mirror 26 which is simultaneously moving in a counterclockwise direction to maintain its incident axis perpendicular to the drum surface.

In operation, mirrors 18, 20 are moved by means not shown from a start-of-scan position (solid line) to an end-of-scan position (dotted line).

In operation, and at start-of-scan, elements 14,18,20,24 and 26 are in the solid-line positions. Drum 28 is rotating in the clockwise direction at a velocity $V_D$. A portion AC of drum 28 is equal in length to points $P_1P_2$ defining the document size parallel to the length of scan with point C representing the image point of document point $P_1$. Mirror 18 and assembly 14 are translated from left to right by means not shown at a velocity $V_s$ which is purposely made larger then drum velocity $V_D$. Mirror 20 moves at a velocity $V_s/2$. A reflected image of the scanned portion of the document, represented by a principal ray travelling along the optical axis, is imaged through lens 22, folded by mirror 24 and reflected from drum mirror 26 to point C on the drum surface. Mirror 26 is positioned at start of scan so as to have incident axis 30 perpendicular to a tangent to the drum surface at point C.

As the scanning proceeds from left to right, the image reflected to the drum surface begins to advance along the surface in a counterclockwise direction due to the ratio of scan to process speed. If mirror 26 were simply pivoted in a stationary position, the incident axis would begin to deviate from the required perpendicularity condition introducing a field tilt defocusing error. Mirror 26 is therefore simultaneously rotated about the center point of the drum at a speed sufficient to maintain axis 30 in the perpendicular condition. This velocity is equivalent to the precessing rate $V_p$. Mirror 24 is also simultaneously translated to maintain the required lens-to-image conjugate distance.

Thus, at the end of scan position, mirrors 26 and 24 have moved to the dotted positions maintaining incident axis 30' perpendicular to the drum surface. Drum 28 has rotated a distance CD and point B is therefore the imaged point corresponding to object point $P_2$ and distance BC represents the precession distance. The time taken by point B to advance to start-of-scan position C is now "free" time which is available to return scan mirror 18, 20 to start-of-scan position. Mirrors 26 and 24 are also returned to their initial start positions during the interval.

To summarize the above operation, an image of document 14 has been formed on the surface of drum 28 along a length represented by AC. The image was formed by laying down the image along this length at a rate faster then the rate of rotation of the drum surface and in an opposing direction, i.e. the image was precessed a distance BC. The ratio of scan speed $V_s$ to drum speed $V_p$ was set to obtain the precession distance BC. The rate of laying down the precessed image, when algebraically combined with scan speed equals the process speed, i.e. $V_s+(-V_p)=V_D$. Dividing precession distance BC by process speed $V_p$ provides the amount of "free" flyback time available for the particular system.

A specific example of a scan system operating in the manner shown in FIG. 1 is as follows:
scan velocity $V_s=9.0$ in/sec
drum velocity $V_D=5.0$ in/sec
document size ($P_1P_2AC$)—9.0 in.
magnification 1:1

In order to obtain an effective flyback time of 0 (the condition where the time taken for point B to rotate to point C equals the time taken for the scan components to return to start of scan position, $V_p=$ $$V_s-V_p=9.0-5.0=4.0$$

It is therefore evident from the above description, that the present scanning system provides a simply implemented precession system for a dual-rate scan arrangement.

The "free" time gained by precessing the image can be used to return the scan components thereby optimizing copy output. The "free" time is also available to change documents either manually or by automatic document handling. The interdocument gap normally present between exposed images on the drum can be minimized or completely eliminated.

Although the present invention has been disclosed in the environment of a dual-rate mirror scan system, other types of scanning systems may be employed. For example, a single mirror with related scan lamp assembly could be used in systems having sufficient interior space requirements. Also, folding mirror 24 may not be necessary in system having sufficient space. And, while the disclosed embodiment operated in a unity magnification mode, operation at other magnifications is possible. For example, if a reduction mode of operation is desirable, lens 22 can be adapted to translate along the optical axis to decrease the lens-to-image distance the required amount. Mirror 24 would have to be adapted for the additional component of motion to maintain the image in proper focus. Mirror 20 would also have to be positioned to establish proper lens to object distance.

What is claimed is:

1. A precession scanning system for scanning a document placed on a flat platen and creating a latent image of said document on a drum photoreceptor surface, said system comprising
   illumination scanning means for scanning said document including means to move said scanning means from a start-of-scan to an end-of-scan position at a first velocity $V_s$,
   projection means positioned along the system optical path and arranged to transmit reflected images from said document during said scanning towards said photoreceptor,
   means for rotating said photoreceptor at a second velocity $V_D$ less than $V_s$, and
   reflector means positioned between said projection means and said photoreceptor, for precessing the projected images onto and along said photoreceptor surface in a direction opposite to the motion of said surface and at a precess velocity $V_p$ equal to $V_s-V_D$ and for movement in synchronism with said scanning means for maintaining the incident angle of said images on said photoreceptor substantially perpendicular to the photoreceptor surface during said scanning.

2. The scanning system of claim 1 wherein said scanning means comprises an illumination source and scan mirror which simultaneously scan said document in a linear direction parallel to said document.

3. The scanning system of claim 1 wherein said scanning means includes an illumination source and scan mirror connected as an assembly to move at said velocity $V_s$ and a second mirror moving at a velocity $V_s/2$ to maintain a constant document-to-lens distance.

4. The scanning system of claim 3 wherein said reflector means is a drum mirror having its incident axis originating at the center of said drum.

5. The scanning system of claim 4 further including a folding mirror positioned along the optical path between said projection means and said drum mirror, said second element adapted for movement during scan to maintain a constant image conjugate.

6. The scanning system of claim 1 wherein a distance $D_p$ precessed on the drum surface is defined by the expression:

$$D_p=mL_D-V_DT_s$$

where
m = system magnification
$L_D$ = length of document scanned
$T_s$ = scanning time ($L_D/V_s$)
and wherein the time $T_r$ taken to return said scanning means from end-of-scan to start-of-scan position is at least equal to the time taken by said drum surface to travel said distance $D_p$.

* * * * *